3,796,817
METHOD FOR PEELING CASHEW NUTS
Otto T. Aepli, Southgate, and Malachy E. Sorgenfrei, Trenton, Mich., assignors to BASF Wyandotte Corporation, Wyandotte, Mich.
No Drawing. Filed July 8, 1971, Ser. No. 160,906
Int. Cl. A23l 1/36
U.S. Cl. 426—287                     9 Claims

ABSTRACT OF THE DISCLOSURE

The skins of nut meats or kernels are effectively removed by immersing the unpeeled nut in an aqueous acid-surfactant solution to loosen the skin and, thereafter, washing and drying the so-treated kernel.

BACKGROUND OF THE INVENTION

1. Field of the invention

The present invention pertains to the peeling of nuts. More particularly, the present invention pertains to cashew nuts and methods for removing the skin therefrom leaving a substantially peeled whole kernel.

2. Prior art

The use of chemical and mechanical processes for the removal of skins from the kernels of nuts has been long known. Today, the most prevalent chemical methods involve subjecting the skin-carrying kernel to an alkaline solution along with agitation or other mechanical action to release the skin therefrom.

The use of alkaline solutions is disadvantageous since the pigments or tannins of the skin tend to deposit within the skinned kernel by diffusing into the kernel at the intersection of the two halves, thereby, giving a permanent discoloration to the so-treated kernel, thus, rendering it unsuitable for sale.

Mechanical action tends to break the kernel into its respective halves and/or other fragmentary sections.

Thus, either singular or cooperative action between alkaline solutions and mechanical action creates a most undesirable environment for processing cashew nuts and the like.

SUMMARY OF THE INVENTION

The present invention provides a process wherein the skin of the cashew nut kernel is removed by a process comprising:

(a) Immersing the kernel in an aqueous acid-surfactant solution to loosen the skin, (b) Washing the so-treated kernels to remove the skin, and then, (c) Drying the kernel to produce the final product.

By employing the present process, it is possible to produce cashew nut kernels or other nut meats of reduced breakage and which are not discolored.

For a more complete understanding of the present invention, reference is made to the following detailed description and examples thereof.

DESCRIPTION OF THE PREFERRED EMBODIMENT

In accordance with the present invention nut kernels, such as, cashews, peanuts, and the like, and in particular, cashew nuts have their outer skin effectively removed therefrom by a process which generally comprises:

(a) Immersing the skin-covered kernel in an aqueous acid-surfactant solution to loosen the skin, (b) Washing the so-treated kernel to remove the skin, and (c) Drying the kernel.

It has been found that by using an aqueous acid-surfactant solution for immersing the kernels to loosen the skin, the problem of discoloration within the kernel is eliminated.

The aqueous acid-surfactant solution contemplated for use herein generally contains from about 0.1 to 50% by weight of acid, based on the weight of the solution, and from about 0.1% to 10% by weight of surfactant, based on the weight of the solution. Thus, the present invention contemplates the use of 0.2 to 60% aqueous acid-surfactant solution. Preferably, a 1.1 to 17.0% aqueous acid-surfactant solution containing from about 1.0 to 12.0% by weight of acid and from about 0.1 to 5% by weight of surfactant is used herein.

The acids which can be used in the first step of the process can be either organic or inorganic, weak or strong acids. Among the useful organic acids are, for example, acetic acid, trichloroacetic acid, gluconic acid, hydroxyacetic acid, and the like, as well as mixtures thereof. Suitable inorganic acids are, for example, phosphoric acid, sulfuric acid, hydrochloric acid, nitric acid, and the like, as well as mixtures thereof.

It is to be understood, also, that mixtures of inorganic and organic acids can be used.

In practicing the present process, the preferred acid is phosphoric acid.

The surfactant used to prepare the immersion solution or peeling liquor can vary widely, also. Thus, nonionic surfactants, anionic surfactants, cationic surfactants, amphoteric surfactants or mixtures thereof can be used. The only criterion associated with the surfactant is that it be soluble in the acid and possess the necessary wetting and penetrating properties.

Suitable nonionic surfactants useful herein include, for example, the condensation product of (1) a linear aliphatic alcohol having from about 8 to 22 carbon atoms in its aliphatic portion or mixtures thereof and (2) alkylene oxide, such as, ethylene oxide, propylene oxide or mixtures thereof, in a weight ratio of ethylene oxide to propylene oxide of from about 0.5:1 to about 7:1, and wherein the alkylene oxide constitutes from about 55% to 80% by weight of the surfactant molecule. These surfactants are generally prepared, under conventional oxyalkylation conditions, by reacting the alcohol, or mixtures thereof, with the alkylene oxides, in either a sequential addition or with a random mixture of oxides and in the presence of an oxyalkylation catalyst. These surfactants are more particularly described in U.S. Pat. Nos. 3,340,309; 3,504,041 and Canada 770,644.

Another useful type of nonionic surfactant is an ethylene oxide-propylene oxide block copolymer surfactant corresponding to the formula $$HO(C_2H_4O)_a(C_3H_6O)_b(C_2H_4O)_aH$$

wherein $b$ is an integer such that the $(C_3H_6O)$ group has a molecular weight of from about 800 to 4000; and $a$ is an integer such that the final molecular weight of the surfactant ranges from about 2000 to 5000. This surfactant and its method of preparation is more particularly described in U.S. Pat. No. 2,674,619.

Suitable anionic surfactants are the well-known linear alkylaryl sulfonate surfactants, such as, the linear alkylbenzene sulfonates which are prepared by the Friedel-Crafts reaction of an olefin and benzene, or derivative thereof, followed by the sulfonation of the intermediate 2-benzylalkylate. The olefin or alkene employed in the preparation of these compounds generally has from 10 to 18 carbon atoms and is usually an α-olefin. These surfactants are, usually, available in alkali metal salt form, such as, the potassium or sodium salt of the linear alkylbenzene sulfonate. Suitable representative compounds of the type herein contemplated can be found in McCutcheon's Detergents and Emulsifiers, 1970 edition.

It should be noted, in regard to the alkylbenzene sulfonates, that in many instances they are available in their unneutralized sulfonic acid form as opposed to their neutralized alkali metal form. In such instances it is possible to forego the use of an acid and use solely an aqueous "surfactant" solution.

Other suitable anionic surfactants are the well-known phosphate esters of nonionic surfactants which are generally prepared by reacting the nonionic surfactant with a phosphoric acid having a high $P_2O_5$ equivalency. Surfactants of this type are more particularly described in U.S. Pat. Nos. 3,122,508 and 3,462,520.

Also, cationic surfactants, such as N-alkyl dimethylbenzyl ammonium chloride, coco amido alkyl betaine, and cetyl dimethylbenzyl ammonium chloride, can be used herein.

The present invention also contemplates the use of amphoteric surfactants which act like cationic surfactants in acid solution. Examples of useful amphoteric surfactants are, for example, N-coco-B-amino propionic acid, N-lauryl myristyl B-amino propionic acid or their alkaline derivatives.

In the practice of the present invention it is preferred to employ an acid-surfactant solution prepared from an octylbenzene sulfonic acid-surfactant and phosphoric acid in a weight ratio of surfactant to acid ranging from about 1:3 to 1:20. This can be previously prepared as a concentrate of surfactant and acid in a respective weight ratio of 1:3 to 1:20 which is then diluted with water to prepare the 0.2 to 60% aqueous acid-surfactant solution.

The immersion solution contemplated for use herein may also contain a supplemental solvent. The solvent, when used, generally comprises from about 0 to 50%, by weight, based on the weight of the solution. Suitable solvents include, for example, ethanol, isopropanol, butyl Cellosolve, ethyl acetate and other water miscible organic solvents and mixtures thereof.

The immersion step of the process is generally carried out by immersing, with agitation, previously deshelled nut kernels in the solution or peeling liquor for a period ranging from about 0.5 to 15 minutes while maintaining the solution at a temperature ranging from about 80° F. to about 210° F. By operating within these parameters, the skin of the kernels are sufficiently loosened to facilitate their complete removal. Complete removal of the skin in the peeling liquor is undesirable since the skin would only accumulate therein.

It should be noted that the actual immersion time will be governed by the design of the equipment used.

After the immersion step is completed, the nut kernels are removed from the solution and are washed with water delivered to the kernels under a pressure ranging from about 5 to 100 p.s.i. This pressure, while being sufficient to remove the skin of the kernel, is insufficient to cause any appreciable breakage of the whole kernel.

The washing step can be carried out on a linear conveyor, a reel, rotary type washer, or like apparatus with the washing means, such as sprayer heads, nozzles, or the like disposed in close proximity thereto.

As is known to those skilled in the art, in order to inhibit discoloration of the outer surface of the peeled kernel, the kernel is treated with an antioxidant after completion of the washing step. The antioxidants utilized are those which are conventionally employed in the food processing industries, such as, citric acid or sodium bisulfite, and preferable sodium bisulfite.

The kernels are treated with the antioxidant, herein, by any conventional process, i.e., spraying, immersion, or the like, preferably, immersion, by contacting the kernels with from about a 0.5 to 10% aqueous solution of antioxidant for a time period ranging from about 15 to 30 seconds.

After the antioxidant treatment is completed, the kernels are then dried, by any suitable method, such as air drying, oven drying or the like. The dried kernals are then usually boiled or roasted in oil to provide the final edible product.

As hereinabove noted, when the present process is utilized to peel cashew kernels, the final products are cream-colored kernels bearing no discoloration, essentially whole in nature.

It should be noted that oftentimes, contingent on the age of the kernels, prior to peeling the kernels it may be efficacious to heat the deshelled kernels in hot air at a temperature of from about 100° F. to 500° F. for about one to thirty minutes to reduce the moisture content thereof, thereby expediting the peeling process. However, the process of the present invention will work without such treatment, but will require employing the outer parameters thereof.

For a more complete understanding of the present invention, reference is made to the following examples of the present invention. In the examples all parts, absent indications to the contrary, are by weight.

EXAMPLE I

To a suitable vessel equipped with heating and agitation means and containing an aqueous acid-surfactant solution is added about 20 gms. of heat-treated, unpeeled cashew nut kernels. While maintaining the solution at a temperature of about 170° F. to 180° F., the kernels are immersed therein for a period of about five minutes under gentle agitation.

Thereafter the kernels are removed from the solution and washed with tap water emitted from a spray head nozzle under a pressure of about 30 p.s.i. By so-washing the kernels, the skin, which is loosened during immersion, is substantially 100% removed from the kernel with little or no breakage of the kernel.

The washed kernels are then allowed to air dry. After drying, the kernels are boiled in oil to provide a final, edible kernel. Small samples of the kernels, after drying, are halved to check for discoloration of which none is found.

The solution used in the example consists essentially of:

Solution A

| Ingredient: | Amount, p.b.w. |
| --- | --- |
| Linear alkylbenzene sulfonic acid[1] | 2.0 |
| Phosphoric acid | [2]7.5 |
| Water | 90.5 |

[1] An alkylbenzene sulfonic acid anionic surfactant having 11 carbon atoms in the alkyl group and sold by Union Carbide under the name UCANE 11.
[2] 10 parts of a 75% phosphoric acid solution in water.

EXAMPLE II

The procedure of Example I is repeated using various aqueous acid-surfactant solutions, as set forth below. In each instance the washing step results in substantially 100% of removal of the skin, little or no breakage of the kernels, and no discoloration thereof.

Solution B

| Ingredient: | Amount, p.b.w. |
|---|---|
| Amphoteric surfactant[1] | 2.0 |
| Nitric acid | 10.0 |
| Water | 88.0 |

Solution C

| Ingredient: | Amount, p.b.w. |
|---|---|
| Amphoteric surfactant[1] | 2.0 |
| Sulfuric acid | 10.0 |
| Water | 88.0 |

Solution D

| Ingredient: | Amount, p.b.w. |
|---|---|
| Linear alkylbenzene sulfonic acid[2] | 4.0 |
| Sulfuric acid | 5.0 |
| Isopropyl alcohol | 10.0 |
| Water | 81.0 |

Solution E

| Ingredient: | Amount, p.b.w. |
|---|---|
| Octyl benzene sulfonic acid | 3.00 |
| Phosphoric acid | [3]3.75 |
| Ethyl alcohol | 10.00 |
| Water | 83.25 |

Solution F

| Ingredient: | Amount, p.b.w. |
|---|---|
| Linear alkylbenzene sulfonic acid[2] | 4.0 |
| Trichloro acetic acid | 5.0 |
| Isopropanol | 10.0 |
| Water | 81.0 |

Solution G

| Ingredient: | Amount, p.b.w. |
|---|---|
| Amphoteric surfactant[1] | 4.0 |
| Phosphoric acid | 5.0 |
| Butyl Cellosolve | 10.0 |
| Water | 81.0 |

[1] N-lauryl myristyl B-amino propionic acid.
[2] UCANE 11, a linear alkylbenzene sulfonic acid sold by Union Carbide and having 11 carbon atoms in the alkyl group.
[3] 5 parts of a 75% phosphoric acid solution in water.

What is claimed is:

1. A method for peeling the skin from nut kernels comprising:
   (a) immersing the kernels for a period of about 0.5 to 15 minutes in a 1.1% to 17.0% by weight aqueous acid-surfactant solution, the solution maintained at a temperature ranging from about 80° F. to 210° F., to loosen the skin from the kernel, and
   (b) washing the kernels with water to remove the skin therefrom.

2. The method of claim 1 wherein said kernels are cashew nut kernels.

3. The method of claim 1 and including the step of drying the kernels after washing.

4. The process of claim 1 and including the steps of contacting the kernels with an antioxidant after washing and thereafter drying the kernels.

5. The method of claim 1 wherein the aqueous acid solution comprises from about 1.0% to 12% by weight, based on the weight of the solution, of the acid and from about 0.1% to 5% by weight of surfactant based on the weight of the solution.

6. The method of claim 5 wherein the solution contains from about 0 to 50% by weight, based on the weight of the solution, of a solvent selected from the group consisting of ethanol, isopropanol, butyl Cellosolve, ethyl acetate and mixtures thereof.

7. The method of claim 5 wherein the acid is selected from the group consisting of sulfuric acid, hydrochloric acid, nitric acid, phosphoric acid, acetic acid, trichloroacetic acid, gluconic acid, hydroxyacetic acid and mixtures thereof.

8. The method of claim 5 wherein the surfactant is selected from the group consisting of nonionic surfactants, anionic surfactants, cationic surfactants, amphoteric surfactants and mixtures thereof.

9. The method of claim 8 wherein the anionic surfactant is the free acid form of a linear alkylbenzene sulfonate and said aqueous acid-surfactant solution consists essentially of the surfactant.

References Cited

UNITED STATES PATENTS

| | | | |
|---|---|---|---|
| 3,307,601 | 3/1967 | Aepli | 99—233.3 X |
| 1,887,256 | 11/1932 | Bizzell | 99—126 X |
| 2,273,183 | 2/1942 | Edes | 99—126 X |
| 2,847,334 | 8/1958 | Kilburn | 146—231 X |
| 3,520,340 | 7/1970 | Takeuchi | 146—231 |
| 3,164,549 | 1/1965 | Seymour | 209—166 |
| 3,457,087 | 7/1969 | Renner | 99—126 |

OTHER REFERENCES

Food Eng., July 1965, p. 101.
Food Eng., June 1968, pp. 95–98.

ROBERT HALPER, Primary Examiner